Sept. 6, 1960  CHEW HOCK LEONG  2,951,429
PHOTOGRAPHIC CAMERAS
Filed Feb. 15, 1957
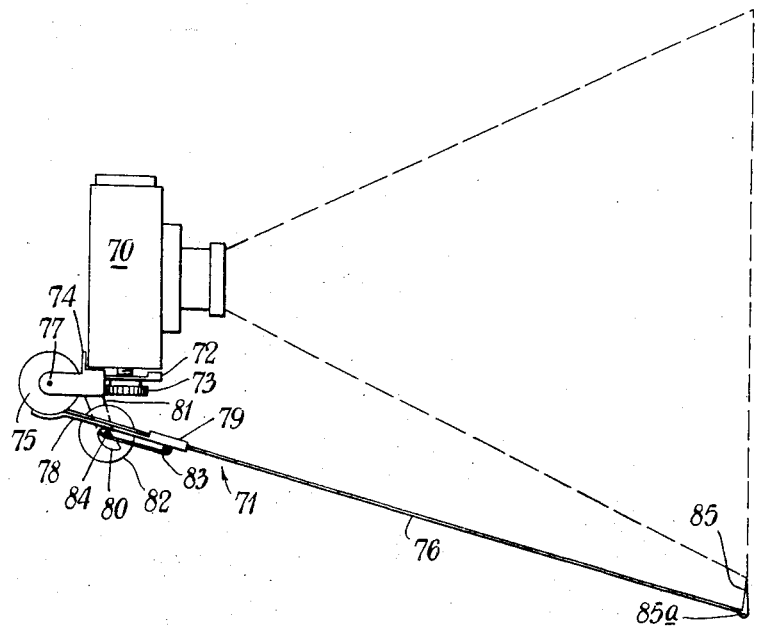

United States Patent Office 2,951,429
Patented Sept. 6, 1960

2,951,429
PHOTOGRAPHIC CAMERAS
Chew Hock Leong, 146 Cairnhill Road, Singapore
Filed Feb. 15, 1957, Ser. No. 640,533
Claims priority, application Great Britain Feb. 17, 1956
7 Claims. (Cl. 95—11)

This invention relates to photographic cameras, and more particularly to photographic equipment for use in close-up photography.

An object of the invention is to devise improved photographic means which can be employed to facilitate the taking of photographs at close quarters of relatively small objects such as insects, flowers, articles of jewellery or parts of larger objects and, in particular, unposed live insects in their natural settings.

According to the present invention there is provided a photographic camera for close-up photography, said camera comprising a camera body and a range indicating device carried by the camera body, said device including a support, a drum pivotally mounted in the support, a spring-loaded retractable tape projecting from the drum for indicating the distance between the camera and a subject being photographed, a pointer carried at or adjacent the end of the retractable tape remote from the drum, a lip projecting from the drum for guiding the tape and for holding the tape firmly in position when the latter is extended from the drum, displaceable cam means mounted on the support and operatively engaging said lip to tilt the lip and drum thereby to adjust the angular disposition of the tape relatively to the axis of the camera lens so that said pointer is located outside the field of view covered by the camera to give a visual indication of the plane upon which the camera is focused, and calibrated means connected to and rotatable with said cam means for controlling displacement of the latter.

The provision of the range indicating device enables a camera to be operated whilst held at arms length away from the eye and by one hand, thus making it possible for objects in awkward corners to be approached and photographed with the least disturbance. This is of particular advantage in the photography of live subjects, such as insects.

Furthermore, the range indicating device facilitates the focusing and sighting of objects in very dim light and thus may be used in combination with flash-light equipment and reflectors for the photography of nocturnal insects. The device is thus of particular advantage to naturalist photographers and may be adapted both for still and cinematograph cameras. The indicating device removes in close-up photography the problems of parallax which usually occur with normal camera sighting or viewing devices offset from the axis of the camera lens.

For a better understanding of the invention and to show how the same may be carried into effect reference will now be made by way of example, to the single figure of the accompanying drawing which is a diagrammatic side elevation of a camera according to the invention.

The illustrated cameras comprises a body 70 fitted with a range indicating device, generally indicated at 71, and comprising a support plate 72 applied to the bottom of the camera and attached thereto by means of a thumb screw 73. Rotation of the plate is prevented by means of a flange 74 extending upwardly at the rear of the support plate 72. A drum 75 housing a spring metal tape 76 is rotatably mounted in a yoke 77 extending rearwardly from the support plate 72. A guide lip 78 extends forwardly from the drum 75, the guide lip having at its free end flanges 79 which project upwardly and inwardly from the side edges of the lip to form a slideway adapted to guide the tape 76 as the latter is drawn from the drum through an outlet aperture formed in the peripheral wall of the drum adjacent the lip 78. As the tape slides along the lip 78 it is frictionally engaged between the guide flanges 79 to project forwardly from the camera, the tape being such that the projecting portions thereof remain substantially straight and rigid. The guide lip 78 bears against a cam 80 pivotally mounted at 84 on an arm 81 depending from the plate 72. The cam 80 is associated with a calibrated milled disc 82 which upon rotation causes the cam 80 to raise or lower the lip 78 thereby to vary the angular inclination of the lip 78 and the tape relatively to the axis of the camera lens. The lip 78 is held in position against the cam 80 by a spring 83 secured to the lip 78 and acting against the pivot 84. An upturned marker pointer 85 is pivotally mounted on a friction hinge 85a at the free end of the tape so as to be angularly adjustable to denote the plane on which the lens has been prefocused and the lower edge of the field of view. The tape 76 will be retained in any one adjusted position by virtue of the frictional engagement thereof with the guide flanges 79. The tape is formed on one side with a scale to indicate the distances to which it is drawn out, and is formed on the other side with markings to indicate the shorter dimension, i.e. the height, of the field covered at each of the selected distances. By reference to the markings on the tape 76, the photographer should, without difficulty, be able to visualise the approximate field of view by imagining a rectangular area having a height corresponding to the appropriate marking and so located that the mid-point of the lower side edge of such rectangular area is coincident with the tip of the pointer 85. The arrangement is such that it is a simple matter for the photographer to approach a momentarily stationary or slowly moving object and to bring and keep the object in focus within the field covered by the camera, thereby ensuring that each photograph taken will show the object positioned as desired in the picture and in good focus. It will be understood that the pointer 85 must point to and indicate the plane in focus. The calibrations on the disc 82 are such that they will indicate the required rotational adjustment of the disc to produce the correct angle of indication of the tape for a selected focusing distance.

It will of course be appreciated that the pointer need not necessarily be directed to the midpoint along one side of the field but could be arranged to indicate a corner or other point of the perimeter of the field provided that the pointer enables the photographer to visualise the approximate field covered.

The indicating device is shown as an attachment for a camera but this device may, of course, be incorporated as an integral part of the camera.

The camera may further be provided with a telescopic tripping device for actuating the shutter, said device having a trigger situated conveniently at the rear of the camera body 70. It is found that this device for tripping the shutter is preferable to the conventional wire release which generally operates jerkily and is liable to disturb or frighten away a sensitive subject, such as an insect, which is being photographed. The coordination between the operation of a flash unit which may be fitted on the camera body and of the shutter can be achieved by appropriate synchronising means.

I claim:
1. A photographic camera for close-up photography, said camera comprising a camera body and a range indicating device carried by the camera body, said device including a support, a drum pivotally mounted in the support, a spring-loaded retractable tape projecting from the drum for indicating the distance between the camera and a subject being photographed, a pointer carried at or adjacent the end of the retractable tape remote from the drum, a lip projecting from the drum for guiding the tape and for holding the tape firmly in position when the latter is extended from the drum, displaceable cam means mounted on the support and operatively engaging said lip to tilt the lip and drum thereby to adjust the angular disposition of the tape relatively to the axis of the camera lens so that said pointer is located outside the field of view covered by the camera to give a visual indication of the plane upon which the camera is focused, and calibrating means connected to and rotatable with said cam means for controlling displacement of the latter.

2. A camera as claimed in claim 1, wherein said device includes spring means for urging the lip against the cam.

3. A camera as claimed in claim 1, wherein the pointer of the device is pivotally mounted on the tape by means of a friction hinge so as to be angularly adjustable relatively to the tape.

4. A photographic camera for close-up photography, said camera comprising a camera body and a range indicating device carried by the camera body, said device including a support removably connected to the base of the camera body, a drum pivotally mounted in the support, a spring-loaded retractable spring metal tape projecting from the drum for indicating the distance between the camera and subject being photographed, a pointer carried at or adjacent the end of the retractable tape remote from the drum, a lip projecting from the drum and having at the end thereof remote from the drum a slideway for guiding the tape and for holding the tape firmly in position when the latter is extended from the drum, an arm depending from said support, a cam rotatably mounted on the end of the said arm remote from said support and operatively engaging said lip to tilt the lip and drum thereby to adjust the angular disposition of the tape relatively to the axis of the camera lens so that said pointer is located outside the field of view covered by the camera to give a visual indication of the plane upon which the camera is focused, and a calibrated disc connected to and rotatable with said cam for controlling displacement of the latter.

5. A camera as claimed in claim 4, wherein the drum is pivotally mounted in a yoke formed in said support.

6. A camera as claimed in claim 4, wherein said cam and its associated calibrated disc are rotatably mounted on a pivot extending laterally of said arm.

7. A camera as claimed in claim 6, wherein said lip and pivot are connected by a spring for urging the lip against the cam.

References Cited in the file of this patent

UNITED STATES PATENTS

| | | |
|---|---|---|
| 1,590,770 | Merle | June 29, 1926 |
| 1,755,177 | Fruwirth | Apr. 22, 1930 |
| 2,107,074 | Hineline | Feb. 1, 1938 |
| 2,239,379 | Bucky | Apr. 22, 1941 |
| 2,322,032 | Kunze | June 15, 1943 |
| 2,511,531 | Hencke et al. | June 13, 1950 |
| 2,537,303 | Cobb et al. | Jan. 9, 1951 |
| 2,590,916 | Back | Apr. 1, 1952 |
| 2,609,737 | Markle | Sept. 9, 1952 |
| 2,667,825 | Nicholas | Feb. 2, 1954 |